INVENTOR
HENRI G. BUSIGNIES
BY
ATTORNEY

United States Patent Office 3,331,068
Patented July 11, 1967

3,331,068
AIRCRAFT IDENTIFIER
Henri G. Busignies, Forest Hills, N.Y., assignor to International Standard Electric Corporation, New York, N.Y., a corporation of Delaware
Filed July 10, 1941, Ser. No. 401,739
5 Claims. (Cl. 343—6)

This invention relates to improvements in radio apparatus for the detection of mobile bodies.

It is an object of the invention to provide improved means for detecting and identifying aircraft in flight.

A more specific object is to provide, in conjunction with aircraft detection apparatus, means for identifying friendly craft so that such craft may not be a target of anti-aircraft or other fire.

A further object is to provide means whereby the identity of friendly aircraft may be known secretly so as secretly to distinguish friendly from enemy craft.

Figure 1:
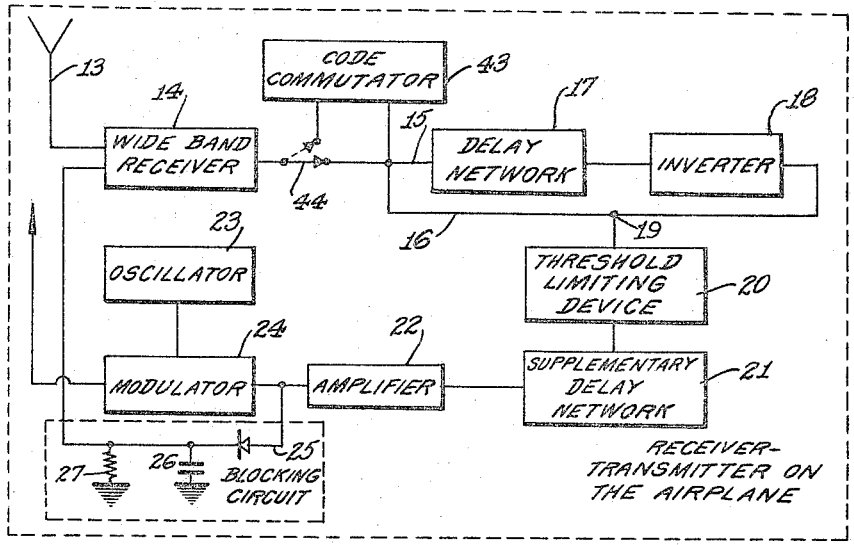

Other objects and further features of novelty and invention will hereinafter be pointed out or will become apparent from a reading of the following specification taken with the drawings included herewith. In said drawings FIGS. 1 and 1a are schematic block diagram layouts of apparatus in accordance with the invention; and FIG. 2 is a graphical representation of wave forms illustrative of operation of portions of the layout of FIG. 1.

Modern aircraft detection systems usually employ impulse modulation to transmit a series of periodically recurrent impulses. This impulse energy is relatively intense; and, when reflected by a body, such as an airplane, the delayed reflected impulse is compared as to time with the transmitted impulse in order to obtain an indication of the proximity or direction of the reflecting body. Of course, such a detecting system is effective to indicate all reflecting bodies within range, and ordinarily no means is provided whereby friendly aircraft so detected may be distinguished from enemy craft.

In accordance with features of the invention I propose that friendly craft be provided with means whereby their identity may be detected and distinguished from that of enemy planes. Specifically this means comprises a receiver responsive to the detection impulses, and a transmitter that will retransmit such received impulse energy in relatively short and highly intense form. The aircraft detecting station will then obtain an unusually strong indication characterizing friendly aircraft, and enemy planes may be readily distinguished therefrom.

Figure 1A:
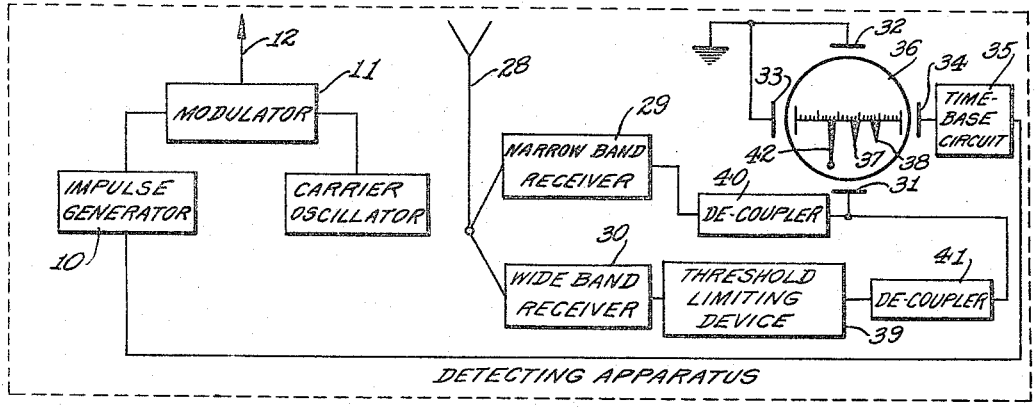
Figure 2:
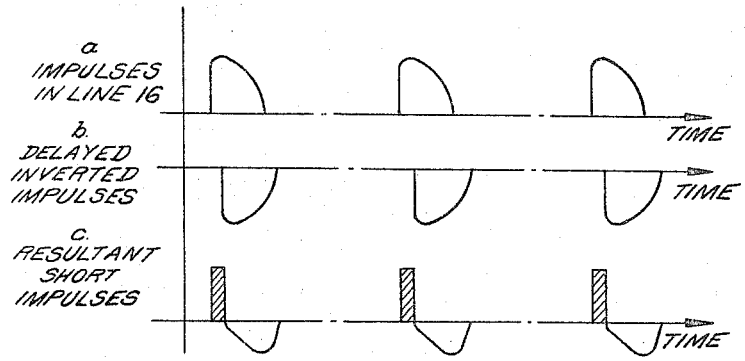

Referring to the schematic layout of FIG. 1a, the aircraft detecting apparatus comprises transmitting and receiving sets. The transmitter may include an impulse generator 10 feeding modulating energy to a modulator 11, whereby the carrier is appropriately modulated, and impulse energy is supplied to antenna means 12 in a conventional manner.

Friendly aircraft are preferably also equipped with apparatus having functions analogous to the blocked layout of FIG. 1. For convenience the description of operation is referred to FIGS. 1 and 1a as arranged on separate craft although it should be clear that each friendly craft is equipped with both units. In this apparatus as shown in FIG. 1a, detection impulse energy, which has been transmitted from antenna 12, is received by antenna means 13 feeding a receiver set 14. Receiver 14 is preferably of the wide frequency band responsive type in order that received impulses when appropriately detected by receiver 14 will be of substantially the same wave form as when generated by impulse generator 10. As will later become apparent it is desirable to detect at 14 as sharp and steep an impulse wave front as possible. The output of receiver 14 is thus preferably a series of well defined, sharp impulses.

In accordance with a method more fully explained in my copending U.S. application Ser. No. 380,186, filed Feb. 24, 1941, (now U.S. Patent 2,423,082) I employ the impulse-characterized output of receiver 14, FIG. 1, to generate a series of highly peaked and relatively short impulses for ultimate retransmission. The details of these circuits are not important to an understanding of this invention and only such description as is needed for this purpose is given. To this end receiver output energy may be supplied to two branch lines 15 and 16. The impulses thus supplied to line 15 are slightly delayed as to time in a time delay network 17 and then reversed as to polarity by appropriate inverting means 18. After such delay and inversion, the delay amounting say to ¼ or ⅕ of the length of an impulse, impulses in both lines 15 and 16 are of substantially the same magnitude, and when they are superimposed upon each other as by junction 19, impulses from one of these branches will tend to cancel out those from the other, all except for the non-overlapping ¼ or ⅕ impulse interval.

The effect of the above described time delay and superposition will be to generate a series of very short impulses, as may be seen from the graphical representations of FIG. 2. FIG. 2a shows the undelayed output of receiver 14 as supplied directly to line 16. The delayed and inverted impulses as so processed in line 15 are seen from FIG. 2b to be of substantially the same form as those in line 16. FIG. 2c illustrates the effect of superimposing both the wave forms of FIGS. 2a and 2b. It will be observed from FIG. 2c that, inasmuch as receiver 14 covered a broad enough frequency band to reproduce a very steep wave front for the impulses, the resultant impulses are exceedingly short and characterized by steep front and trailing slopes or edges. At this point it may be noted that the actual shape of impulse generated at 10 and detected at 14 has nothing substantially to do with the shape of the short pulses of FIG. 2c, provided the impulse wave front is steep enough.

The undesired trailing lobe following each impulse is of a polarity opposite to that desired and may hence be eliminated by appropriate known threshold limiting means 20. Output of device 20 may thus have a form analogous to the shaded areas of FIG. 2c. After threshold limiting, a supplemental or additional slight time delay may be introduced in the impulses by a network 21, for purposes that will later become apparent. The delay so introduced is preferably slightly greater than the overlap interval of impulses in lines 15 and 16 and less than the length of impulse transmitted from the detecting apparatus. In accordance with the invention the impulse output of delay network 21 is in a form suitable for retransmission in the usual manner. This transmission preferably first includes amplification at 22 and employs the amplified output thereof to modulate at 24 a carrier supplied by an oscillator 23.

In order to prevent undesirable amplitude oscillations being set up in the airplane apparatus just described I consider it preferable to block the receiver 14 or render it ineffective during the interval in which the shaded impulses of FIG. 2c are being transmitted. Since these impulses were appropriately delayed by network 21 so as not to occur at the portion of the impulse cycle in which they are derived, such blocking will have no harmful effect upon generation of these desired short impulses. Any type of blocking means, such as for instance mechanical or electronic keying means, may be employed for blocking purposes, but I prefer to use discharge energy from a condenser to control the bias of the grid of some tube in receiver 14. Accordingly, impulse output from amplifier 22 is rectified at 25 and employed periodically to charge condenser 26. During the interval between impulses, condenser 26 discharges across a bias resistor 27; and, by appropriate selection of the capacitance and resistance parameters of these elements, the receiver will be effectively blocked so as to prevent reception at the airplane of impulses transmitted therefrom and so as not to interfere with the generation of these impulses.

Returning to the detecting apparatus of FIG. 1a, receiving antenna means 28 will be responsive not only to the impulse energy retransmitted from a friendly aircraft or apparatus similar to that of FIG. 1, but also to energy originally transmitted at 12 and reflected by the same aircraft, among others. Received energy from antenna 28 is supplied to two receiving channels—one 29 responsive to a relatively narrow band of frequencies, and the other 30 responsive to a relatively wide band of frequencies.

Receiving means 29, being responsive to a relatively narrow band of frequencies will detect substantially only energy reflected from aircraft and merely a small, relatively insignificant component of that retransmitted. The reason for this property of receiver 29 is that the impulses generated at 10 (and reflected) are relatively long and, as above indicated may be of any form. On the other hand, signals retransmitted from friendly aircraft are relatively short and in order to receive a substantial indication of such short signals a relatively wide frequency band must be covered (to include a large number of the component harmonics). Receiver 29 thus detects substantially only reflected energy, which of itself would be indicative of the presence of hostile as well as friendly craft. In the form shown, output from receiver 29 is applied between the vertical deflection plates 31, 32 of a cathode ray tube 36, upon the horizontal deflection plates 33, 34 of which is applied sweep circuit energy as generated by network 35 synchronized with impulse generator 10. There appear thus upon the screen of tube 36 a series of vertical deflections indicative of characteristic coordinate or other dimensions of neighboring aircraft. By appropriate amplifier control means included in receiver means 29, deflections corresponding only to reflected energy are relatively short, as deflections 37, 38.

As above indicated, the relatively intense impulses retransmitted from friendly aircraft require relatively wide frequency band coverage for appropriate reception and detection. Accordingly, receiver 30 is designed to pass a band of frequencies wide enough to accommodate these short impulses without distortion. Of course, reception in such a receiver as 30 may include not only the desired intense impulses but also a great deal of noise as well as reflected impulse energy. However, since the reflected impulse energy is relatively weak, it will be lost in the noise, and the only predominant signals will be those transmitted by friendly aircraft. Appropriate biasing or threshold limiting means 39 may eliminate the noise and apply only substantially pure impulse energy between the vertical deflection plates 31, 32. Appropriate decoupler means 40, 41 may be provided between receivers 29, 30 and the vertical deflection plates for preventing energy from being fed between these receivers, as will be clear.

It will be recalled that the impulse energy retransmitted from the friendly aircraft was so derived as to be in phase or coincidental with reflected energy characterizing its location. As a result, therefore, deflections on the screen of tube 36 will be decidedly great, as in the case of spot 42, for friendly craft and decidedly short for the enemy planes, as in the cases of spots 37, 38. Thus, the indications shown in FIG. 1 for screen 36 indicate the presence of three aircraft, one friendly and two enemy planes near each other. Anti-aircraft batteries may thus discriminate between aircraft and need not be concerned as to shooting down friendly planes.

In accordance with a further feature of the invention means are provided for identifying friendly aircraft with substantially the same apparatus even if the enemy has provided its aircraft with the proposed apparatus. This further identification means may comprise a code commutator or other keying device that will operate relatively slowly to make the friendly aircraft transmitter operate in slow dots and dashes so that the appropriate flashing on the screen of tube 36 will serve further to identify friendly craft. Such codifying means 43 may be provided between receiver 14 and the branching into lines 15 and 16. In the form shown, a manual switch 44 will insert or remove the codifying apparatus as desired.

While the invention has been described in particular detail in connection with the preferred form shown, it is to be understood that many modifications, omissions, and additions may be made fully within its scope. For example, the principles of the invention are applicable not only to the indicating means shown here by way of illustration, but to any other known means. Furthermore, the friendly aircraft indication could be made on one side of an indicating axis, and all reflection indication could appear by contrast on the other side as can readily be achieved by a phase reversal of the impulses in wide band receiver 30.

If desired limiter means may be provided in the circuit of receiver 30 for assuring that friendly aircraft will be identified by pulses of one substantially uniformly large magnitude. Such means may further aid in spotting friendly ships, for any signal indication of a magnitude obviously other than such a uniform signal will more positively locate the enemy. On the other hand, limiter means could be provided in receiver 29, so that all enemy craft would show up because of a uniform cathode ray deflection. Of these two alternatives, I prefer the former inasmuch as the magnitude of reflected energy from enemy craft may be a useful quantity in furnishing information as to the size of enemy craft in the neighborhood.

What I claim is:

1. The method of distinguishing between and identifying two mobile craft, which comprises transmitting periodically recurrent impulse energy, from the first of said craft receiving and detecting such energy on the second of said craft, generating impulses on said second craft, said generated impulses being in time coincidence with a portion of said received energy, and said generated impulses being of relatively short duration as compared with said periodically recurrent impulses, transmitting said generated impulses from said second craft, blocking said reception and detection on said second craft for the interval during which said generated impulses are transmitted therefrom, receiving and detecting on said first craft said transmitted periodically recurrent impulse energy as reflected by said second craft, and receiving and detecting on said first craft said generated impulses transmitted from said second craft.

2. In an aircraft identification system, receiver means responsive to a relatively wide band of frequencies, impulse generating means responsive to impulse energy detected by said receiver, said impulse generating means including delay means for time delaying impulses detected by said receiver, and means superimposing detected impulse energy upon impulse energy delayed by said delay means, said delayed impulse energy being of a polarity sense opposite to that of the impulse energy superimposed thereon, and transmitter means including means modulated by energy resulting from such superposition.

3. An aircraft identification system according to claim 2, further comprising blocking means responsive to impulses generated by said impulse generating means and rendering said receiver means ineffective during intervals of transmission of impulses generated by said impulse generating means.

4. An aircraft identification system according to claim 2, further comprising delay means time delaying impulses generated by said impulse generating means, said time delay being less than the length of a received impulse.

5. In an aircraft identification system, receiver means responsive to a relatively wide band of frequencies, first time delay means coupled to the output of said receiver, polarity inverting means having an input coupled to the output of said delay means, threshold limiting means having an input coupled to the outputs of said receiver and of said inverting means, transmitter means including modulator means, second time delay means coupled between the output of said limiting means and said modulator means, said threshold means adapted to eliminate undesired negative components of the energy applied to the input thereof whereby the resultant energy is caused to control said modulator means.

References Cited

UNITED STATES PATENTS

| | | | |
|---|---|---|---|
| 2,134,716 | 11/1938 | Gunn | 250—2.3 |
| 2,143,035 | 1/1939 | Smith. | |
| 2,207,267 | 7/1940 | Plaistowe | 250—1.12 X |

RODNEY D. BENNETT, *Primary Examiner.*

C. D. BACKUS, WARREN WILLNER, MELVIN H. FRIEDMAN, CHESTER L. JUSTUS, *Examiners.*

M. A. MORRISON, T. H. TUBBESING,
*Assistant Examiners.*